UNITED STATES PATENT OFFICE.

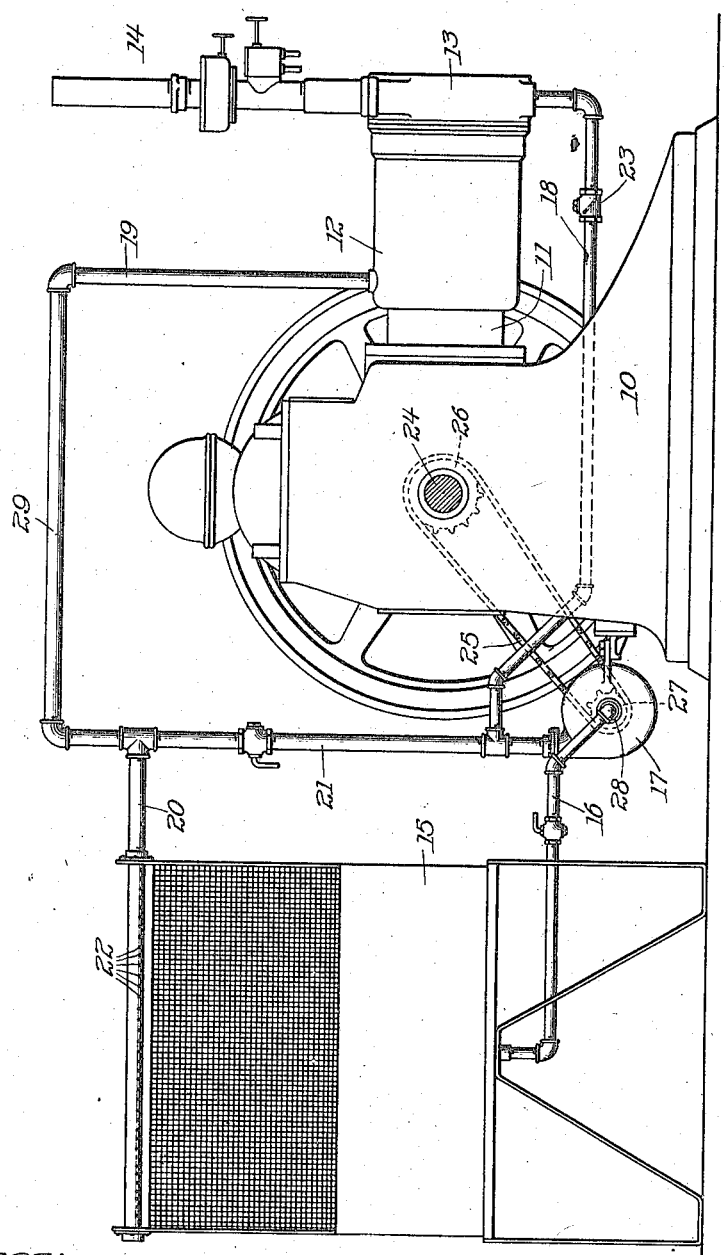

EDWARD A. JOHNSTON, OF CHICAGO, ILLINOIS, ASSIGNOR TO INTERNATIONAL HARVESTER CORPORATION, A CORPORATION OF NEW JERSEY.

INTERNAL-COMBUSTION ENGINE.

1,129,101.

Specification of Letters Patent.

Patented Feb. 23, 1915.

Application filed January 15, 1914. Serial No. 812,187.

*To all whom it may concern:*

Be it known that I, EDWARD A. JOHNSTON, a citizen of the United States, residing at Chicago, in the county of Cook and State of Illinois, have invented certain new and useful Improvements in Internal-Combustion Engines, of which the following is a full, clear, and exact specification.

This invention relates to internal combustion engines, and more particularly to means for maintaining the combustion chambers thereof at the proper temperature for the successful and economical utilization of the heavier grades of fuels.

This invention finds particular use in connection with internal combustion engines in which the heavier liquid fuels, such as crude petroleum, solar oil or kerosene are used. It has been discovered that, among other things, the reliability of the engine operation and its efficiency in converting into work the heat of combustion of such heavy liquid fuels is largely dependent upon a proper control of the temperature of the walls of the cylinder and combustion chamber. It has been found that it is necessary to maintain substantially a constant temperature in all the walls in contact with the explosive mixture, and, furthermore, that it is desirable and possible to secure an automatic control of this temperature in spite of a natural tendency for it to vary with the quantity of mixture exploded in accordance with the load demands.

The object of this invention is to maintain the cylinder walls at substantially a constant temperature so that various kinds of fuel, and especially the heavier fuels, such as kerosene, solar oil and distillate, may be successfully and economically used to meet all of the requirements for the best commercial operation. This object is accomplished by supplying cooling water from a suitable source of supply, under a desired pressure, direct to a water jacket surrounding the cylinder and combustion chamber of an internal combustion engine, providing said water jacket with an overflow outlet which requires a higher pressure to expel water from said jacket than is required to supply water thereto, the overflow being intermittent and caused by steam generated in said water jacket, and means for preventing a backward flow of said water from said water jacket.

The invention is illustrated on the accompanying sheet of drawings, which discloses a side elevation of an internal combustion engine embodying this invention.

The various novel features of the invention will be apparent from the description and drawing and will be particularly set forth in the appended claims.

The internal combustion engine 10 may be of any particular type having a cylinder 11 and water jacket 12 surrounding said cylinder. Said cylinder is provided with a hollow end head 13, connected to which is a carbureter or mixer 14 for supplying either or both light and heavy fuels to the combustion chamber of the engine. In the use of gasolene as fuel for internal combustion engines no particular attention is given to the temperature, within certain limits, of the cylinder or the walls of the combustion chamber. However, in the use of the heavier fuel oils, such as solar oil, distillate, or kerosene, in order to meet the requirements for successful operation, it is necessary that the temperature of the cylinder and combustion chamber walls be maintained substantially constant and comparatively high.

It is old to provide a cylinder with a water jacket and supply water thereto, having the hot water rise and circulate in a system for cooling the cylinder walls. With such a system, however, the temperature of the cylinder walls would not be maintained at as high a temperature as is desirable for the successful use of the heavier grades of fuel oils. For this reason a different system has been provided in which the water is supplied from a suitable source, at a desired pressure, direct to the water jacket surrounding the cylinder and combustion chamber; the overflow outlet of the water jacket being at such a height to require a higher pressure to expel water therein than required to supply water thereto, the overflow being intermittent and caused by steam generated in said jacket. Where the overflow means is at such a height requiring greater pressure to expel the water than the pressure necessary to supply it from some particular source, it is necessary that some force be developed in the water jacket to expel the water therein. This force is developed within the water jacket by the changing of part of the water therein into steam, and this steam, which is formed in a pocket, in a geyser-like manner, expels or ejects from the water jacket the water, or a portion thereof, lying between this steam pocket and the overflow pipe. Cold water is forced into the water jacket to take the place of the hot boiling water ejected, and the steam which also escapes after the water has been forced out. In this manner the temperature of the cylinder walls is maintained higher than would be the case in other water circulating systems. At the same time the temperature of the cylinder and combustion chamber walls is maintained substantially constant, and the action is intermittent and automatic.

The relatively cold water is supplied from any suitable source, such as a cooling tank 15, through a pipe 16, and forced, by means of a pump 17, through a pipe 18, into the hollow end head 13 forming a part of the water jacket 12. The water thus forced into the water jacket 12 rises in an overflow or outlet pipe 19, extending from the upper part of the water jacket, to the same level as a pipe 20 connected to a pipe 21, through which water is also forced by the pump 17. Under ordinary conditions the water in the pipe 19 will rise no higher than the level of pipe 20, and any excess supply of water drawn from the source of supply 15 by the pump 17 and forced into the system, will pass up through the pipe 21 and pipe 20, where said excess supply of water will be sprayed through the perforations 22 in the pipe 20, and flow back into the cooling tank, or source of supply. The water in the water jacket is prevented from flowing backwardly through pipe 18 by a check valve 23, which is arranged to permit the water to flow from the supply source to the water jacket. The pump may be driven from any suitable source. In this particular case it is driven from the crank shaft 24 of the engine by means of a chain 25, passing over sprocket wheel 26 on the crank shaft, and a sprocket wheel 27 on the pump shaft 28. The inlet pipe 18 leading to the water jacket enters the water jacket preferably at the head of the cylinder, and the overflow outlet pipe connected to the water jacket preferably at the rear of the cylinder.

In starting up an internal combustion engine, usually gasolene is used until the temperature of the cylinder walls has been raised sufficiently high to permit of the use of some of the heavier fuels, such as distillate, solar oil or kerosene, at which time the supply of gasolene is discontinued. Let it be considered that the engine is in operation, that the water jacket 12 is full of water and the pipe 19 is filled up to the level of pipe 20, and that the pump 17 is in operation drawing water from a source of supply or cooling tank 15. As long as the water in pipe 19 is at a height on a level with pipe 20 no more water will be forced into the water jacket 12, and the excess supply of water drawn from the source of supply by the pump will be forced up through the pipes 21 and 20, from which it will be sprayed through the perforations 22 in the pipe 20. In the meantime, during the operation of the engine, there having been a series of explosions of the mixture in the combustion chamber, the temperature of the walls of the cylinder has necessarily risen considerably, causing the temperature of the water in the water jacket to have risen proportionately. This hot water will not rise in the pipe 19 and flow in a continuous stream as in the ordinary water cooling systems, due to the fact that the height of the water in the pipe 19 is no higher than the level of pipe 20. The water in the water jacket and in pipe 19, of necessity, has to remain therein until it is forced therefrom by some energy developed in the water jacket itself. This, however, occurs when heat is transmitted from the cylinder and combustion chamber walls to the water in the water jacket to cause some of the water to be changed into steam. This steam is formed in a pocket adjacent the hottest part of the combustion chamber. It is apparent, and also a fact, that the water lying between this pocket of steam and the overflow pipe of the water jacket, together with the water in pipe 19, will be forced out of, or expelled from, the water jacket and pipe 19 by this generated steam, the water and steam passing from pipe 19 and through connecting pipe 29, which is connected to pipe 20, from which the hot water is sprayed into the cooling receptacle 15. Due to the decreased pressure in the water jacket, after such hot water has been ejected therefrom, cold water is forced past the check valve 23 and into the water jacket. Here, again, relatively cold water absorbs heat from the walls of the cylinder and combustion chamber and, in turn, after a portion of it has been changed into steam, is ejected from the water jacket. This expulsion, in a geyser-like manner, of the hot water from the water jacket, caused by the formation of steam therein, occurs intermittently, the action being entirely automatic, and at the same time the temperature of the cylinder and combustion chamber walls is maintained substantially constant and at the proper value.

There may be various modifications of the invention as herein particularly shown and described, and it is my intention to cover all such modifications which do not depart from the spirit and scope of my invention, as set forth in the appended claims.

What I claim as new is:

1. In an internal combustion engine, the combination of a cylinder, a water jacket therefor, a source of water supply, power operated means for supplying cooling water therefrom and at a desired pressure to said jacket, overflow means for said water jacket requiring a higher pressure to expel said water, the overflow being intermittent and caused by steam generated in said jacket, and means to prevent a backward flow of said water.

2. In an internal combustion engine, the combination of a cylinder, a liquid containing jacket therefor, a source of liquid supply, power operated means for supplying a liquid from said source at a desired pressure to said jacket, overflow means for said liquid containing jacket requiring a higher pressure to expel said liquid, the overflow being intermittent and caused by said liquid being changed to a vaporous state within said jacket, and means for preventing a backward flow of said liquid.

3. In an internal combustion engine, the combination of a cylinder, a fluid containing jacket therefor, a source of fluid supply, power operated means for supplying fluid therefrom at a desired pressure to said jacket, exhaust or overflow means for said fluid containing jacket requiring a higher pressure to expel said fluid, the exhaust or overflow being intermittent and caused by additional pressure generated in said jacket, and means to prevent a backward movement of said fluid.

4. In an internal combustion engine, the combination of a cylinder, a water jacket therefor in which a steam pocket is adapted to be formed in one portion thereof, a source of water supply, power operated means for supplying water therefrom at a desired pressure to said jacket, overflow means located at another portion of said jacket and requiring a higher pressure to expel said water, the overflow being caused by steam generated in said jacket, the water between said steam pocket and overflow being discharged intermittently, and means to prevent a backward flow of said water.

5. In an internal combustion engine, the combination of a cylinder, a water jacket therefor, a source of water supply from which water is supplied to said water jacket, and power operated means for affecting said supply, the water being intermittently ejected from said water jacket in response to temperature conditions of said cylinder.

6. In an internal combustion engine, the combination of a cylinder, a water jacket therefor, a source of water supply from which water is supplied therefrom at a desired pressure to said jacket, and power operated means for affecting said supply, said water jacket permitting the water to be intermittently ejected therefrom and admitted thereto in response to temperature conditions of said cylinder.

7. In an internal combustion engine, the combination of a cylinder, and a water circulating system comprising two related parts, one including a water jacket for said cylinder, a source from which water is supplied to said jacket, and power operated means for affecting the water supply, there being a continuous flow of water in that part of said system other than the part including said water jacket, the flow of water in the part including said water jacket being intermittent.

8. In an internal combustion engine, the combination of a cylinder, and a water circulating system comprising a plurality of parts connected in parallel, one of said parts including a water jacket for said cylinder, a source of water supply from which water is supplied to said jacket, and power operated means for affecting said supply, there being an intermittent flow of water in the part including said water jacket and a continuous flow of water in the other part.

In testimony whereof I affix my signature, in the presence of two witnesses.

EDWARD A. JOHNSTON.

Witnesses:
T. E. HOUSTON,
JAMES D. McGANN.